United States Patent
Yamazawa

(10) Patent No.: US 10,451,041 B2
(45) Date of Patent: Oct. 22, 2019

(54) WIND POWER GENERATION DEVICE

(71) Applicant: Toshimitsu Yamazawa, Sapporo (JP)

(72) Inventor: Toshimitsu Yamazawa, Sapporo (JP)

(*) Notice: Subject to any disclaimer, the term of this patent is extended or adjusted under 35 U.S.C. 154(b) by 550 days.

(21) Appl. No.: 15/029,180

(22) PCT Filed: Oct. 15, 2014

(86) PCT No.: PCT/JP2014/077469
§ 371 (c)(1),
(2) Date: Apr. 13, 2016

(87) PCT Pub. No.: WO2015/056722
PCT Pub. Date: Apr. 23, 2015

(65) Prior Publication Data
US 2016/0258420 A1    Sep. 8, 2016

(30) Foreign Application Priority Data

Oct. 18, 2013   (JP) ................ 2013-216877

(51) Int. Cl.
*F03D 9/00*     (2016.01)
*F03D 3/06*     (2006.01)
*F03D 3/00*     (2006.01)

(52) U.S. Cl.
CPC ........... *F03D 9/007* (2013.01); *F03D 3/005* (2013.01); *F03D 3/061* (2013.01); *F03D 3/062* (2013.01);
(Continued)

(58) Field of Classification Search
CPC ........ F03D 3/005; F03D 3/0418; F03D 3/061; F03D 3/062; F03D 9/007; F05B 2250/712;
(Continued)

(56) References Cited

U.S. PATENT DOCUMENTS 7,084,523 B2 *   8/2006   Noguchi ............... F03D 3/005
                                                           290/54
2005/0099013 A1   5/2005   Noguchi
(Continued)

FOREIGN PATENT DOCUMENTS

JP       H06167269 A     6/1994
JP       H11173257 A     6/1999
(Continued)

OTHER PUBLICATIONS

International Search Report of PCT/JP2014/077469.

*Primary Examiner* — Ninh H. Nguyen
*Assistant Examiner* — Maxime M Adjagbe
(74) *Attorney, Agent, or Firm* — Muncy, Geissler, Olds & Lowe, P.C.

(57) ABSTRACT

[Problem] To provide a wind power generation device that, by using a structure that easily receives drag, improves the certainty of starting up on activation and is capable of increasing the amount of electric power generated from natural energy by the entire device.
[Solution] A wind power generation device having a vertical rotary shaft (2) that imparts a rotating force to a wind power generation motor (7), multiple support arms (3) that extend from this vertical rotary shaft (2) and are radially arranged at equal intervals, and wind paddles (4) that are connected to the tips of the respective support arms (3), wherein each wind paddle (4) is provided with a concave panel part (41) wherein the outer surface side is curved or bent into a concave shape in a plan view and a front edge airflow reservoir part (42); that protrudes toward the outer surface side along the front edge part (45) of this concave panel part (41) in the rotating direction with the front end part thereof being curved or bent toward the trailing edge side.

2 Claims, 8 Drawing Sheets

(52) U.S. Cl.
CPC ..... *F05B 2220/708* (2013.01); *F05B 2240/51* (2013.01); *F05B 2250/712* (2013.01); *Y02E 10/74* (2013.01)

(58) Field of Classification Search
CPC ........... F05B 2240/51; F05B 2220/708; Y02E 10/74; Y02E 10/50; Y02E 10/1056; Y02E 10/10563
USPC ..................................... 415/4.1, 4.2, 4.3, 4.4
See application file for complete search history.

(56) References Cited

U.S. PATENT DOCUMENTS

| | | | |
|---|---|---|---|
| 2009/0160196 A1* | 6/2009 | Metzloff | F03D 3/005 290/55 |
| 2011/0133474 A1* | 6/2011 | Haar | F03D 3/06 290/55 |
| 2012/0301301 A1* | 11/2012 | Sauer | F03D 3/065 416/170 R |
| 2013/0093191 A1 | 4/2013 | Janowska | |

FOREIGN PATENT DOCUMENTS

| | | |
|---|---|---|
| JP | 2001132617 A | 5/2001 |
| JP | 2003218190 A | 7/2003 |
| JP | 3451085 B1 | 9/2003 |
| JP | 2006090293 A | 4/2006 |
| JP | 2011099330 A | 5/2011 |
| JP | 2011112013 A | 6/2011 |
| JP | 2011132929 A | 7/2011 |
| JP | 2013534592 A | 9/2013 |
| WO | 2011069238 A1 | 6/2011 |

* cited by examiner

WIND POWER GENERATION DEVICE

TECHNICAL FIELD

The present invention relates to a wind power generator that uses renewable energy.

BACKGROUND ART

In the world, there are many people for whom it is difficult to enjoy the convenience of electricity, such as residents of an area where neither a power generator set nor a power transmission line is installed and nomads who have no settled residence. In the past, those people used a generator that is easy to install, such as a compact solar photovoltaic panel, to generate electric power. However, the solar photovoltaic panel can generate electric power only during the daytime when the panel can receive sunlight and therefore has a problem that the panel cannot electric power during the night when electric power is most needed for illumination or other purposes.

In recent years, compact wind power generators have been proposed that have simple structures, are robust and easy to install and can generate electric power even during the night.

For example, in Japanese Patent No. 3451085, there is proposed a wind turbine for wind power generation having a plurality of blades arranged in a plane perpendicular to a vertical rotation shaft at regular angular intervals about the vertical rotation shaft, in which the blades have an airfoil shape, and the blade is partially cut away on the rotation shaft side from a point at a distance of 35% to 45% of the chord length from the front edge to the rear edge (Patent Literature 1). According to Patent Literature 1, the wind turbine for wind power generation can efficiently revolve even when the wind turbine is activated or even in a low wind speed range, because the cut-away part of the blade on the side of the airfoil lower surface generates a high air resistance, and characteristics of the drag type wind turbine and characteristics of the lift type wind turbine are effectively combined.

CITATION LIST

Patent Literature

Patent Literature 1: Japanese Patent No. 3451085

SUMMARY OF INVENTION

Technical Problem

However, according to the invention described in Patent Literature 1, the wind turbine is designed mainly for producing lift, the width of the cut-away part receiving the air resistance cannot be equal to or larger than the thickness of the blade. Therefore, the area of the cut-away part that receives wind is extremely narrow, and there is a possibility that a rotational moment enough to activate the blade is not produced in a low wind speed range in which little lift is produced.

Some of the conventional propeller-type wind power generators are designed to be activated in a low wind speed range equal to or lower than 3 m/s. However, to activate such wind power generators at a wind speed equal to or lower than 3 m/s, the wind needs to blow approximately perpendicularly to the propellers, and it is practically difficult to activate the power generators at a wind speed equal to or lower than 3 m/s.

The present invention has been devised to solve the problem described above, and an object of the present invention is to provide a wind power generator that has a structure that easily receives a drag in a direction of rotation and allows the wind power generator to start operating with higher reliability when activated, and can generate an increased amount of electric power as a whole by using natural energy.

Solution to Problem

A wind power generator according to the present invention comprises: a vertical rotation shaft that transmits a rotational force to a wind power generating motor; a plurality of supporting arms radially provided on the vertical rotation shaft at regular intervals; and a wind paddle connected to a tip end of each of the supporting arms, and the wind paddle includes a concave panel part and a front edge airflow reservoir part, the concave panel part being curved or bent to be recessed on the side of an outer surface thereof in plan view, the front edge air flow reservoir part being provided along a front edge part of the concave panel part, which is located forward in a direction of rotation, and protruding on the side of the outer surface, and a tip end portion of the front edge airflow reservoir part being curved or bent toward a rear edge part of the concave panel part.

According to an aspect of the present invention, the wind paddle and the supporting arm may be connected to each other at a point closer to a front edge part of the wind paddle than a midpoint between the front edge part and the rear edge part of the wind paddle.

According to an aspect of the present invention, the length from a part of the wind paddle connected to the supporting arm to the rear edge part of the wind paddle may be longer than the supporting arm.

According to an aspect of the present invention, the wind paddle may include an upper edge airflow stopping part and a lower edge airflow stopping part provided on the side of the outer surface along an upper edge part and a lower edge part of the concave panel part.

Furthermore, the vertical rotation shaft may be rotatably supported in a floating state by a repulsive force of magnets.

According to an aspect of the present invention, the wind paddle may have a vertically elongated shape with a vertical dimension thereof being longer than the distance between the front edge part and the rear edge part, a solar photovoltaic power generating element may be provided on either or both of an inner surface and the outer surface of the concave panel part, the wind power generator may include an energizing mechanism that passes a current between an electrode of the solar photovoltaic power generating element and an electrode provided on a shaft support that supports the vertical rotation shaft, and the energizing mechanism may include: an element-side positive electrode gear that is fixed to the vertical rotation shaft and connected to a positive electrode of the solar photovoltaic power generating element so that a current can flow therebetween; an element-side negative electrode gear that is fixed to the vertical rotation shaft and connected to a negative electrode of the solar photovoltaic power generating element so that a current can flow therebetween; a shaft support-side positive electrode gear that is rotatably fixed to the shaft support, engaged with the element-side positive electrode gear and connected to a positive electrode of the shaft support so that a current can flow therebetween; and a shaft support-side negative electrode gear that is rotatably fixed to the shaft support, engaged with the element-side negative electrode gear and connected to a negative electrode of the shaft support so that a current can flow therebetween.

Advantageous Effect of Invention

According to the present invention, the wind power generator has a structure that easily receives a drag in a direction of rotation and allows the wind power generator to start operating with higher reliability when activated, and can generate an increased amount of electric power as a whole by using natural energy.

DESCRIPTION OF EMBODIMENTS

In the following, a wind power generator 1 according to an embodiment of the present invention will be described with reference to the drawings.

Figure 1:
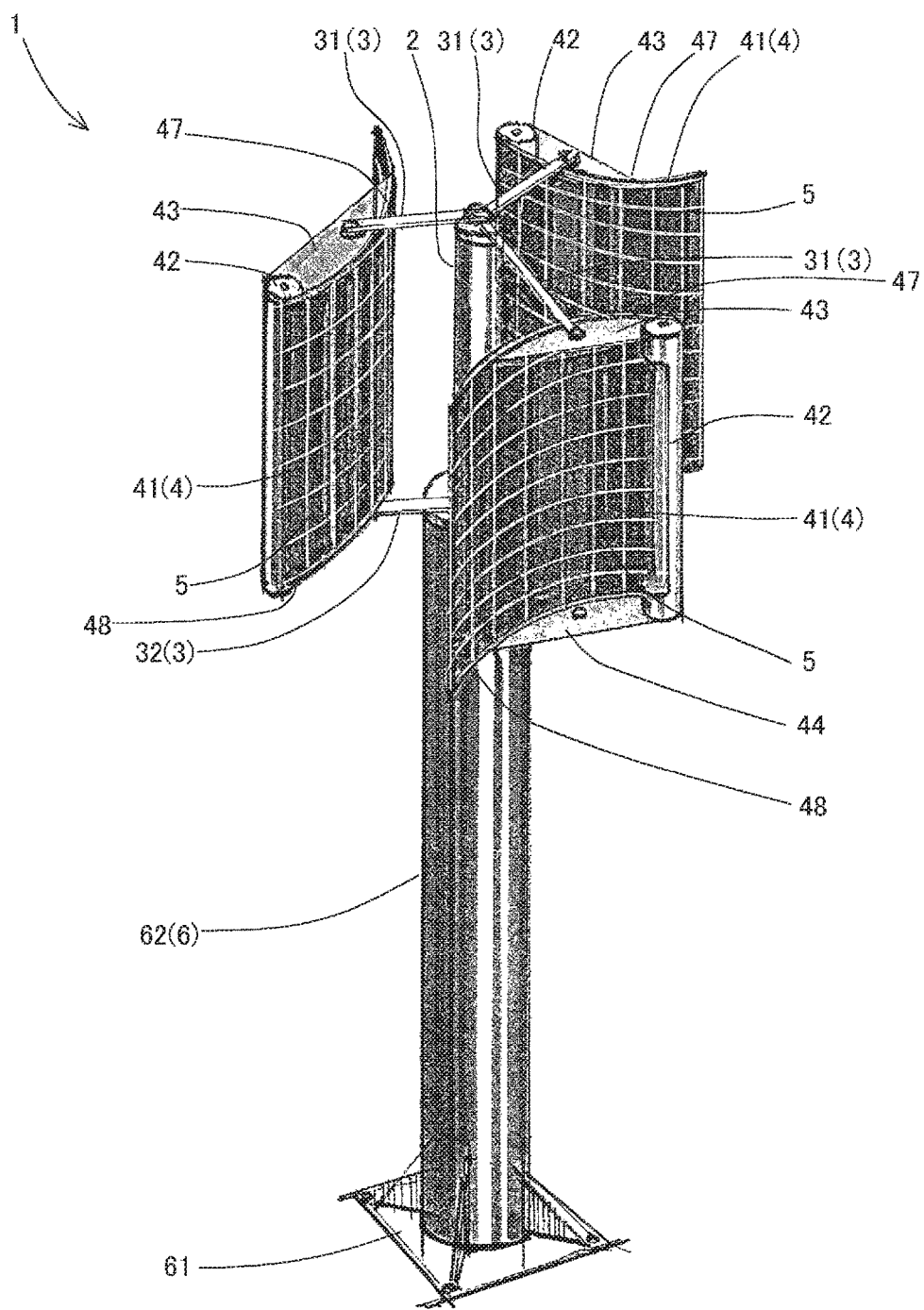
FIG. 1 is a perspective view of a wind power generator according to an embodiment of the present invention.

As shown in FIG. 1, the wind power generator 1 according to this embodiment comprises a vertical rotation shaft 2 that transmits a rotational force to a wind power generating motor 7, a plurality of supporting arms 3 radially arranged at regular intervals from the vertical rotation shaft 2, wind paddles 4 connected to the supporting arms 3 at tip ends thereof, solar photovoltaic power generating elements 5 provided on surfaces of the wind paddles 4, and a shaft support 6 that rotatably supports the vertical rotation shaft 2.

The components of the wind power generator 1 according to this embodiment will be individually described in detail below.

Figure 2:
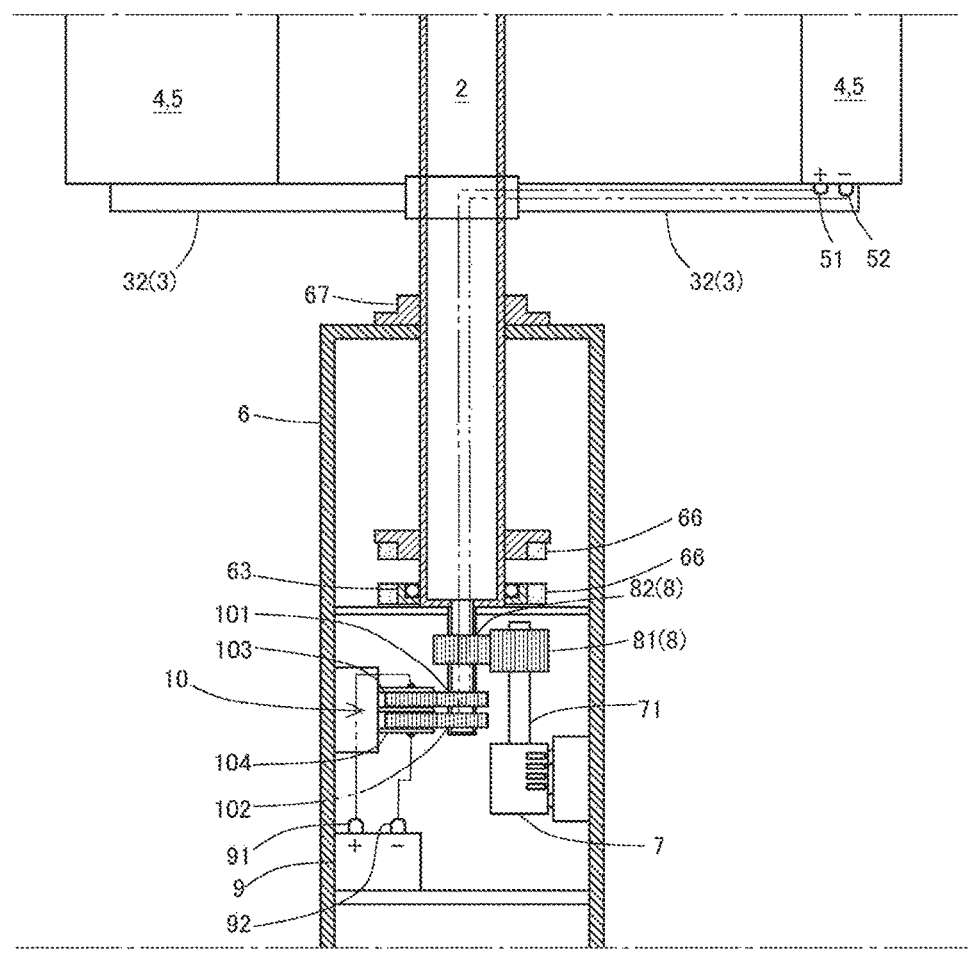
FIG. 2 is a vertical cross-sectional view showing an inside of a shaft support according to the embodiment.

The vertical rotation shaft 2 is formed by a steel pipe or the like and is rotatably vertically supported by the shaft support 6 as shown in FIG. 1. As shown in FIG. 2, the vertical rotation shaft 2 according to this embodiment rotatably supported on the shaft support 6 is held at two vertically spaced points by a ball bearing 63 for reducing the rotational friction and a socket 67 for preventing a shaft misalignment during rotation.

As shown in FIG. 2, the vertical rotation shaft 2 and the shaft support 6 are provided with a pair of magnets 66, 66 that are arranged with the like poles (the S pole and the S pole, or the N pole and the N pole, for example) being opposed to each other, and the vertical rotation shaft 2 can be supported by the shaft support 6 in a state where the vertical rotation shaft 2 floats in the shaft support 6 by the action of the repulsive force between the magnets 66 and 66. In this embodiment, the magnets 66 are neodymium magnets, which have a strong magnetic force.

The vertical rotation shaft 2 is provided with a rotation transmission mechanism 8, which transmits the rotational force of the vertical rotation shaft 2 to the wind power generating motor 7, at a lower end thereof as described later. Furthermore, a chromium-plated sheet or the like that is mirror-finished to have a high light reflectance is applied to a surface of the vertical rotation shaft 2 so as to reflect more sunlight toward the wind paddles 4.

Figure 3:
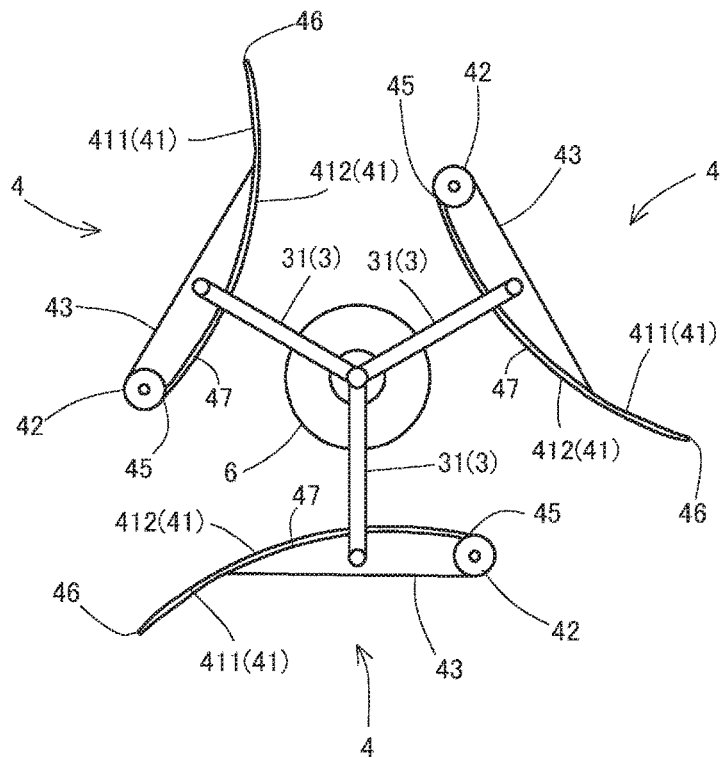
FIG. 3 is a plan view of the wind power generator according to the embodiment.
Figure 4:
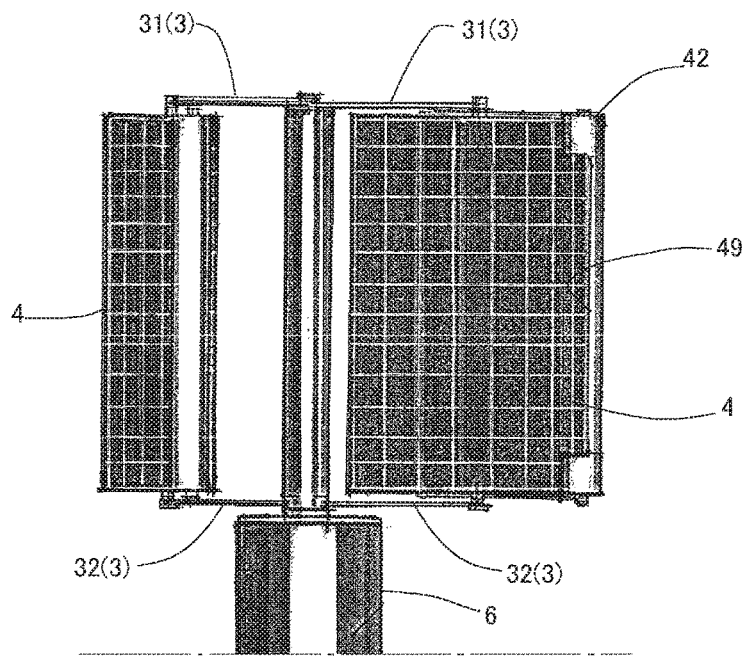
FIG. 4 is a front view of a wind paddle according to the embodiment.

The supporting arms 3, which support the wind paddles 4, are fixed to the vertical rotation shaft 2 at regular intervals to radially extend from the vertical rotation shaft 2. In this embodiment, as shown in FIGS. 1 and 3, three pairs of upper and lower supporting arms 3 are provided on the vertical rotation shaft 2 at intervals of 120° along the circumference thereof, and the upper and lower supporting arms 3 of each pair are connected to an upper end and a lower end of one wind paddle 4, respectively. Upper supporting arms 31 are made of a transparent material, such as an acrylic resin, and surfaces of lower supporting arms 32 are mirror-finished to have a high light reflectance so as to guide more sunlight to the wind paddles 4.

The number of and the circumferential interval between the supporting arms 3 are not particularly limited and can be appropriately determined taking into consideration the shape or weight of the wind paddles 4 to be supported or the amount of received sunlight, for example.

The wind paddles 4 receive wind and produce a rotational force on the vertical rotation shaft 2. The wind paddle 4 has a concave panel part 41 that receives wind and guides the wind toward the front edge and a front edge airflow reservoir part 42 that receives the wind guided by the concave panel part 41 and converts the force of the wind into a rotational force. As shown in FIG. 1, the wind paddle 4 according to this embodiment has an upper edge airflow stopping part 43 and a lower edge airflow stopping part 44 that prevent the wind received by the concave panel part 41 from escaping in the vertical direction. In short, the wind paddle 4 according to this embodiment is a paddle part of a paddle-type wind power generator that has a novel shape.

Figure 5:
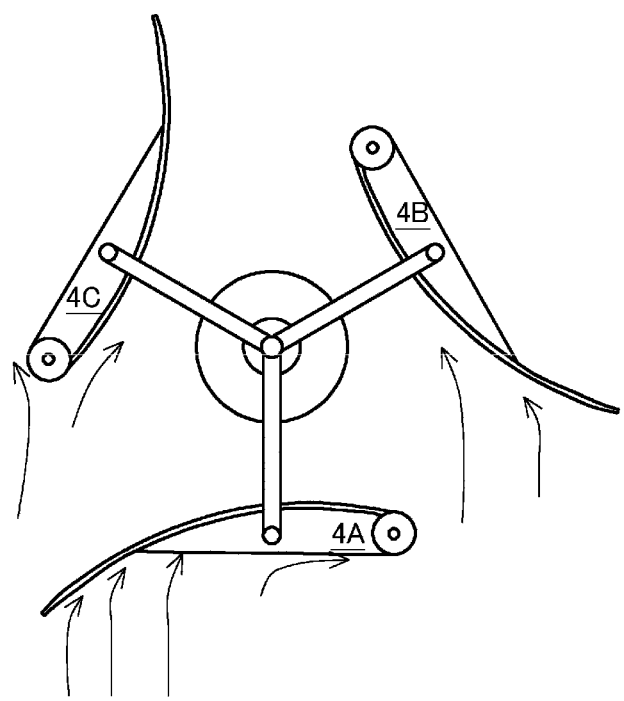
FIG. 5 is a plan view showing an airflow to the wind power generator in a case where the wind power generator receives wind from the side of a wind paddle 4A.
Figure 5:
Figure 9:
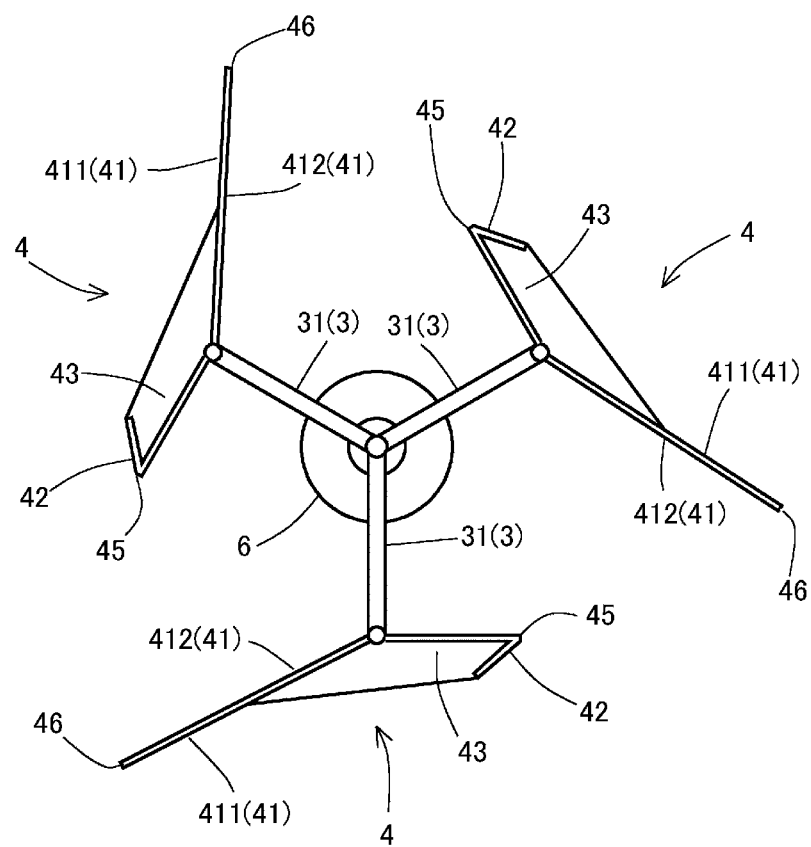
FIG. 9 is a plan view of a wind power generator according to another embodiment of the present invention.

In this embodiment, as shown in FIGS. 1 and 3, the concave panel part 41 is a panel having a substantially rectangular shape that is curved in plan view. Thus, as shown in FIG. 5, when the concave panel part 41 is arranged with the concave surface facing outward, the concave panel part 41 can more efficiently receive wind blowing from the outside and guide the received wind toward the front edge. The present invention is not limited to the concave panel part 41 that is curved in plan view, and a polygonal panel formed by straight lines in plan view as shown in FIG. 9 is also possible.

As shown in FIG. 3, the concave panel part 41 according to this embodiment is shaped with the length from the part thereof connected to the supporting arm 3 to a rear edge part 46 thereof being longer than the supporting arm 3. By increasing the length from the part connected to the supporting arm 3 to the rear edge part 46 in this way, as shown in FIG. 5, the area of the following concave panel part 41 that is hidden by the concave panel part 41 from the wind is increased.

Furthermore, solar photovoltaic power generating elements 5 are provided on both an inner surface and an outer surface of the concave panel part 41 according to this embodiment. In order to increase the area where the solar photovoltaic power generating elements 5 can be provided, the concave panel part 41 has a vertically elongated shape with the vertical dimension thereof being longer than the width from a front edge part 45 to the rear edge part 46. In this embodiment, the solar photovoltaic power generating elements 5 are amorphous-based solar cells. However, any other material that converts optical energy of sunlight into electric power can be used. Furthermore, although the solar photovoltaic power generating elements 5 are provided on both an outer surface 411 and an inner surface 412 of the concave panel part 41, the solar photovoltaic power generating element 5 may be provided on only one of the surfaces.

The material of the concave panel part 41 is not particularly limited and can be appropriately selected from among metals or synthetic resins, for example. The panel itself may be a solar photovoltaic power generating panel, or a film provided with the solar photovoltaic power generating element 5 may be applied to a surface of the panel.

The front edge airflow reservoir part 42 is provided along the front edge part 45, which is located forward in the direction of rotation of the concave panel part 41, and protrudes outward, and a tip end portion thereof is curved or bent toward the rear edge of the concave panel part 41. The front edge airflow reservoir part 42 according to this embodiment is formed by an aluminum pipe to reduce the weight. The front edge air flow reservoir part 42 has a circular or arc-shaped outer periphery that is smoothly connected to the concave panel part 41 in plan view as shown in FIGS. 1 and 3, and an inner portion of the front edge airflow reservoir part 42 is cut away along the axis thereof to form an airflow stopping hole 49.

The present invention is not limited to the front edge airflow reservoir part 42 formed by a pipe, and the front edge airflow reservoir part 42 may be appropriately formed by a rectangular panel member or the like as shown in FIG. 9.

The upper edge airflow stopping part 43 is provided on the side of the outer surface 411 of the concave panel part 41 along an upper edge part 47 of the concave panel part 41. As shown in FIGS. 1 and 3, the upper edge airflow stopping part 43 according to this embodiment is formed by a transparent acrylic plate provided to cover the upper edge part 47 of the concave panel part 41 from the upper edge part 47 to the front edge airflow reservoir part 42. Therefore, the upper edge airflow stopping part 43 not only stops the airflow of the wind received by the concave panel part 41 but also transmits sunlight to increase the amount of sunlight reaching the outer surface 411 of the concave panel part 41.

The lower edge airflow stopping part 44 is provided on the side of the outer surface 411 of the concave panel part 41 along a lower edge part 48 of the concave panel part 41. As shown in FIGS. 1 and 3, the lower edge airflow stopping part 44 according to this embodiment is formed by an acrylic plate provided to cover the lower edge part 48 of the concave panel part 41 from the lower edge part 48 to the front edge airflow reservoir part 42. An upper surface of the lower edge airflow stopping part 44 is mirror-finished to have a high light reflectance, so that the lower edge airflow stopping part 44 not only stops the airflow of the wind received by the concave panel part 41 but also reflects received sunlight toward the outer surface 411 of the concave panel part 41.

As shown in FIG. 3, the wind paddle 4 is connected to the supporting arm 3 at a point closer to the front edge part 45 than the midpoint between the front edge part 45 and the rear edge part 46 of the wind paddle, in order to increase the wind receiving area toward the rear edge thereof. Furthermore, the wind paddle 4 is supported by the supporting arm 3 in an inclined state with the front edge airflow stopping parts 42 inwardly deflected in order to facilitate the airflow from the rear edge part 46 to the front edge part 45. According to this embodiment, the wind paddles 4 are inclined at an angle of approximately 7° to 8° with respect to a tangent to the rotational orbit. If the angle is too small, wind is less likely to flow along the wind paddle 4. On the other hand, if the angle is too large, the drag of the wind on the wind paddle 4 decreases.

Next, the shaft support 6 and an internal configuration thereof will be described. As shown in FIG. 1, the shaft support 6 has a base part 61 at a lower end thereof and a shaft supporting part 62 provided on the base part 61. The base part 61 according to this embodiment is intended to fix the wind power generator 1 in a standing position and is formed by a rectangular plate having four holes, through which bolts are inserted, at four corners thereof.

The shaft supporting part 6 has a cylindrical shape and contains the wind power generating motor 7, a rotation transmission mechanism 8 that transmits the rotational force of the vertical rotation shaft 2 to the wind power generating motor 7, a solar photovoltaic charger 9 that accumulates electric power generated by the solar photovoltaic power generating element 5, and an energizing mechanism 10 that passes a current between an electrode of the solar photovoltaic power generating element 5 and an electrode of the solar photovoltaic charger 9, as shown in FIG. 2.

The wind power generating motor 7 is a common power generating motor having a rotation shaft 71 and is fixed in the shaft support 6 as shown in FIG. 2.

The rotation transmission mechanism 8 is a mechanism that transmits the rotational force of the vertical rotation shaft 2 to the rotation shaft 71 of the wind power generating motor 7. According to this embodiment, the rotation transmission mechanism 8 has a motor-side gear 81 provided on the rotation shaft 71 of the wind power generating motor 7 and a rotation shaft-side gear 82 provided at the lower end of the vertical rotation shaft 2. That is, the rotation transmission mechanism 8 according to this embodiment is configured to transmit the rotational force of the vertical rotation shaft 2 to the rotation shaft 71 of the wind power generating motor 7 by engagement of the motor-side gear 81 and the rotation shaft-side gear 82.

The solar photovoltaic charger 9 is a common charger that accumulates electric power generated by the solar photovoltaic power generating elements 5 provided on both the surfaces of the curved panel part 41 and is installed in the shaft support 6 as shown in FIG. 2.

The energizing mechanism 10 is a mechanism that passes a current between an electrode of the solar photovoltaic power generating element 5 and an electrode of the solar photovoltaic charger 9, and entanglement of cords or the like thereof does not occur even when the vertical rotation shaft 2 rotates. According to this embodiment, as shown in FIG. 2, the energizing mechanism 10 has an element-side positive electrode gear 101 and an element-side negative electrode gear 102 fixed to the vertical rotation shaft 2 and a shaft support-side positive electrode gear 103 and a shaft support-side negative electrode gear 104 rotatably fixed to the shaft support 6.

The element-side positive electrode gear 101 is a gear, such as a spur gear, that is made of a conductive material, such as a metal. The element-side positive electrode gear 101 is fixed to a lower end part of the vertical rotation shaft 2 and is connected by wire to a positive electrode 51 of the solar photovoltaic power generating element 5 so that a current can flow therebetween.

As with the element-side positive electrode gear 101, the element-side negative electrode gear 102 is a gear, such as a spur gear, that is made of a conductive material, such as a metal. The element-side negative electrode gear 102 is fixed to the lower end part of the vertical rotation shaft 2 and is connected by wire to a negative electrode 52 of the solar photovoltaic power generating element 5 so that a current can flow therebetween. The element-side negative electrode gear 102 and the element-side positive electrode gear 101 are electrically isolated from each other, so that no current flows therebetween.

The shaft support-side positive electrode gear 103 is a gear that is made of a conductive material, such as a metal, and is rotatably fixed to the shaft support 6 at a position where the shaft support-side positive electrode gear 101 is engaged with the element-side positive electrode gear 101. Therefore, the shaft support-side positive electrode gear 103 comes into contact with and is engaged with the element-side positive electrode gear 101, and a current flows therebetween. The shaft support-side positive electrode gear 103 is connected to a positive electrode 91 of the solar photovoltaic charger 9 provided in the shaft support 6 so that a current can flow therebetween.

As with the shaft support-side positive electrode gear 103, the shaft support-side negative electrode gear 104 is a gear that is made of a conductive material, such as a metal, and is rotatably fixed to the shaft support 6 at a position where the shaft support-side negative electrode gear 104 is engaged with the element-side negative electrode gear 102. Therefore, the shaft support-side negative electrode gear 104 comes into contact with and is engaged with the element-side negative electrode gear 102, and a current flows therebetween. The shaft support-side negative electrode gear 104 is connected to a negative electrode 91 of the solar photovoltaic charger 9 provided in the shaft support 6 so that a current can flow therebetween. Furthermore, the shaft support-side negative electrode gear 104 and the shaft support-side positive electrode gear 103 are electrically isolated from each other, so that no current flows therebetween.

Next, an operation of each component of the wind power generator 1 according to this embodiment will be described.

First, a case where the wind power generator 1 according to this embodiment receives wind from the side of a wind paddle 4A (from bottom to top in FIG. 5) as shown in FIG. 5 will be described.

In this case, the wind paddle 4A receives the wind primarily at the outer surface 411 of the concave panel part 41. The received wind flows along the concave panel part 41, which is curved and inclined with respect to the tangent to the rotational orbit, from the rear edge part 46 to the front edge part 45. Since the wind paddle 4A according to this embodiment is shaped to be longer on the rear edge side, the wind paddle 4A can guide more air flow toward the front edge part 45. Furthermore, the upper edge airflow stopping part 43 and the lower edge airflow stopping part 44 prevents the airflow of the wind hitting the outer surface 411 of the concave panel part 41 from flowing in the vertical direction and guide the wind toward the front edge part 45.

The front edge airflow reservoir part 42 of the wind paddle 4A receives the wind flow and reacts to the force of the wind by producing a rotational torque about the vertical rotation shaft 2. Since the tip end portion of the front edge airflow reservoir part 42 is curved or bent toward the rear edge, the airflow guided from the rear edge side can be efficiently converted into a rotational torque. The rotational torque is transmitted to the vertical rotation shaft 2 through the supporting arm 3 to make the vertical rotation shaft 2 rotate. The direction of rotation of the wind paddle 4 is a counterclockwise direction in FIG. 5.

At the same time, a wind paddle 4B receives the wind primarily at the inner surface 412 of the concave panel part 41 and produces a pushing force in the direction of the wind as shown in FIG. 5. Therefore, the wind paddle 4B pushed by the wind makes the vertical rotation shaft 2 rotate in the counterclockwise direction in FIG. 5. In this embodiment, since the length from the part of the wind paddle 4A connected to the supporting arm 3 to the front edge part 45 is short, the wind paddle 4B can receive more wind.

On the other hand, a wind paddle 4C rotates against the wind and produces a rotational force in the opposite direction (clockwise direction) to the rotational direction (counterclockwise direction) of the vertical rotation shaft 2. However, since the wind paddle 4A is shaped to be longer on the rear edge side, the following wind paddle 4C is shielded to some extent by the wind paddle 4A from the wind, so that the rotational force in the opposite direction is small. In addition, the wind paddle 4C is disposed on the tip end of the supporting arm 3 with the outer surface 411 of the concave panel part 41 facing outward. Therefore, the wind paddle 4C has a small projected area in the wind direction as shown in FIG. 5, and therefore, the rotational force in the opposite direction (clockwise direction) produced by the drag of the wind is small.

Since the wind paddle 4 according to this embodiment is formed in an airfoil shape, the airflow in the vicinity of the front edge part 45 is straightened to reduce the number of stagnation points that occur at the front edge airflow stopping part 42, and the resistance to the rotational force of the vertical rotation shaft 2 is further reduced.

As can be seen from the above description, if the wind power generator 1 receives wind from the side of the wind paddle 4A as shown in FIG. 5, the wind paddles 4A and 4B easily produce the rotational moment in the counterclockwise direction from the drag of the wind. On the other hand, the wind paddle 4C is located at a position where the wind paddle 4C rotates in the direction opposite to the wind direction. However, the wind paddle 4C receives a small amount of wind, has a small projected area and therefore receives a small wind drag, so that production of a rotational moment that hinders the rotation of the vertical rotation shaft 2 is suppressed.

Figure 6:
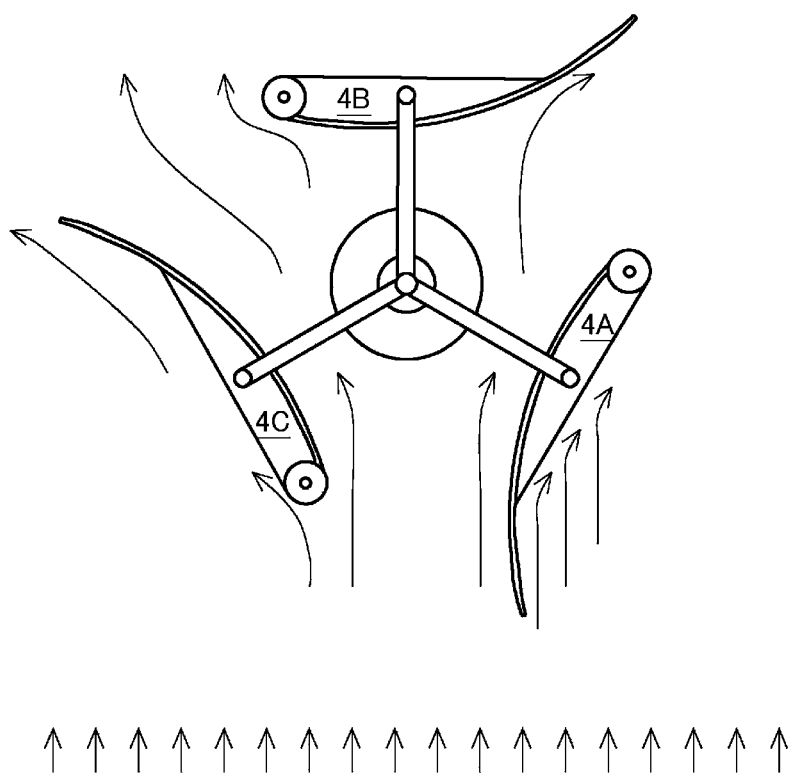
FIG. 6 is a plan view showing an airflow to the wind power generator in a case where the wind power generator receives wind from the side of the wind paddle 4A and a wind paddle 4C.

Next, a case where the wind power generator 1 receives wind from the side of the wind paddles 4A and 4C (from bottom to top in FIG. 6) as shown in FIG. 6 will be described.

As shown in FIG. 6, the wind paddle 4A receives the wind primarily at the outer surface 411 of the concave panel part 41. The received wind flows along the concave panel part 41 from the rear edge part 46 to the front edge part 45. The front edge airflow reservoir part 42 receives the wind flow and reacts to the force of the wind by producing a rotational torque in the counterclockwise direction about the vertical rotation shaft 2. The amount of the wind received by the wind paddle 4A is smaller than the amount of the wind received by the wind paddle 4A in the case where the outer surface 411 of the concave panel part 41 directly receives the wind. However, the supporting arm 3 adds to the distance between the wind paddle 4A and the vertical rotation shaft 2, so that the wind paddle 4A can produce a high torque with the reduced amount of wind.

As shown in FIG. 6, the inner surface 412 of the concave panel part 41 of the wind paddle 4B faces the wind, so that the wind paddle 4B produces little rotational force in the direction of rotation and the opposite direction. Therefore, the wind paddle 4B makes little contribution to the rotation of the vertical rotation shaft 2.

On the other hand, as shown in FIG. 6, the wind paddle 4C is in the inclined position with the front edge inwardly deflected with respect to the wind direction. As a result, the wind is divided by the front edge airflow reservoir part 42 into an inner flow and an outer flow. The inner surface 412 of the concave panel part 41 and the front edge airflow reservoir part 42 formed in an airfoil shape produce a pressure difference between the outer side and the inner side of the wind paddle 4C and produce a lift in the inward direction. In general, a lift of a wing is a force to pull to the front edge side and to the convex surface side. Therefore, as shown in FIG. 6, the lift is a force to make the vertical rotation shaft 2 rotate in the positive direction (counterclockwise direction). According to this embodiment, the wind paddle 4 has a vertically elongated shape with the vertical dimension thereof longer than the distance between the front edge part 45 and the rear edge part 46 and therefore efficiently produces a lift.

As can be seen from the above description, if the wind power generator 1 receives wind from the side of the wind paddles 4A and 4C as shown in FIG. 6, the wind paddle 4A receives the wind at a position where the wind paddle 4A can easily produce a torque on the vertical rotation shaft 2 and produces a rotational moment in the counterclockwise direction from the drag of the wind. On the other hand, the wind paddle 4C is located at a position where the wind paddle 4C rotates in the direction opposite to the wind direction. However, the wind paddle 4C produces a torque smaller than the torque produced by the wind paddle 4A. In addition, the wind paddle 4C produces a lift in the inward direction to add to the rotational force.

As can be seen from the above description, with the wind power generator 1 according to this embodiment, the vertical rotation shaft 2 can efficiently rotate as the force conditions shown in FIGS. 5 and 6 alternately occur, although the magnitude and direction of the rotational force produced by each wind paddle 4 vary with the rotation. Thus, regardless of the direction of the wind received, the wind power generator 1 can start rotating with reliability when the generator 1 is activated and can easily keep rotating during operation. For example, the wind power generator 1 can be started with a slight wind at a wind speed of 3 m/s or lower.

Furthermore, since the vertical rotation shaft 2 floats in the shaft support by the action of the magnets, so that the frictional resistance by the shaft support 6 is reduced, and the wind power generator 1 can be more easily activated.

As shown in FIG. 2, the vertical rotation shaft 2 transmits the rotational force to the rotation shaft 71 of the wind power generating motor 7 through the rotation transmission mechanism 8. The wind power generating motor 7 generates electric power as the rotation shaft 71 rotates.

Next, an arrangement involved with a solar photovoltaic function in the wind power generator 1 according to this embodiment will be described.

The solar photovoltaic power generating elements 5 provided on the surfaces of the concave panel part 41 receive sunlight and generate electric power. According to this embodiment, the upper edge airflow stopping part 43 is transparent, so that light is transmitted through the upper edge airflow stopping part 43 to reach the outer surface 411 of the concave panel part 41. In addition, the mirror-finished surfaces of the vertical rotation shaft 2 and the lower edge airflow stopping part 44 reflect sunlight to the outer surface 411 and the inner surface 412 of the concave panel part 41 to increase the amount of light received by the solar photovoltaic power generating elements 5.

Thus, the solar photovoltaic power generating elements 5 can efficiently receive more sunlight, and the wind power generator 1 according to this embodiment can efficiently generate electric power from sunlight.

In addition, according to this embodiment, since the wind paddle 4 is vertically elongated, the wind paddle 4 can easily produces a lift, and the area available for installation of the solar photovoltaic power generating elements 5 increases, and therefore, the amount of generated electric power also increases.

The electric power generated by the solar photovoltaic power generating elements 5 is fed to the solar photovoltaic charger 9 through the energizing mechanism 10. More specifically, when the element-side positive electrode gear 101 and the shaft support-side positive electrode gear 103 come into contact with and are engaged with each other, a current can flow therebetween. Similarly, when the element-side negative electrode gear 102 and the shaft support-side negative electrode gear 104 come into contact with and are engaged with each other, a current can flow therebetween. Therefore, as shown in FIG. 2, the positive electrode 51 and the negative electrode 52 of the solar photovoltaic power generating element 5 forms one loop electric circuit, and a current generated by the solar photovoltaic power generating element 5 is accumulated in the solar photovoltaic charger 9 through the electric circuit.

In addition, since the gears 103 and 104 on the side of the shaft support 6 are rotatable, the gears 103 and 104 can rotate with the element-side gears 101 and 102 and do not hinder the rotation of the vertical rotation shaft 2. That is, if the solar photovoltaic power generating elements 5 and the solar photovoltaic charger 9 were connected by wire, such as cords, the cords would be entangled as the vertical rotation shaft 2 rotates. However, according to this embodiment, such a problem does not arise.

The wind power generator 1 according to this embodiment described above has the following advantages.

1. The wind power generator is configured to easily receive the drag of the wind in the rotational direction, so that the wind power generator can start operating with reliability when activated, and the amount of electric power generated using wind and sunlight as energy sources can be increased.

2. Wind is concentrated on the front edge airflow reservoir part 42, and the projected area in the wind direction is reduced to reduce the resistance to the rotation of the vertical rotation shaft 2, thereby facilitating the rotation of the vertical rotation shaft 2.

3. The lift produced on the inner surface 412 of the wind paddle provides a force to assist the rotation of the vertical rotation shaft 2.

4. The size of the wind paddle 4 is increased, so that the lift and the amount of generated electric power are increased.

5. Since gears are used for connection, cords or the like, which would be twisted and cut as the vertical rotation shaft 2 rotates, are unnecessary.

6. Since the wind paddles 4 are supported with the outer surfaces 411 thereof facing outward, the space needed for installation thereof is reduced compared with the case where the wind paddles 4 are arranged with the longitudinal direction thereof aligned with the radial direction, and the wind power generator 1 can be easily installed on the roof floor of an office building or in a vacant lot next to a building, for example.

7. Since the wind power generator 1 is made from light members, the rotational resistance due to the self-weight can be reduced.

The wind power generator according to the present invention is not limited to the embodiment described above and can be modified as required.

For example, although the gears of the energizing mechanism 10 and the gears of the rotation transmission mechanism 8 are separate gears in the embodiment described above, the energizing mechanism 10 and the rotation transmission mechanism 8 may share a gear.

Figure 7:
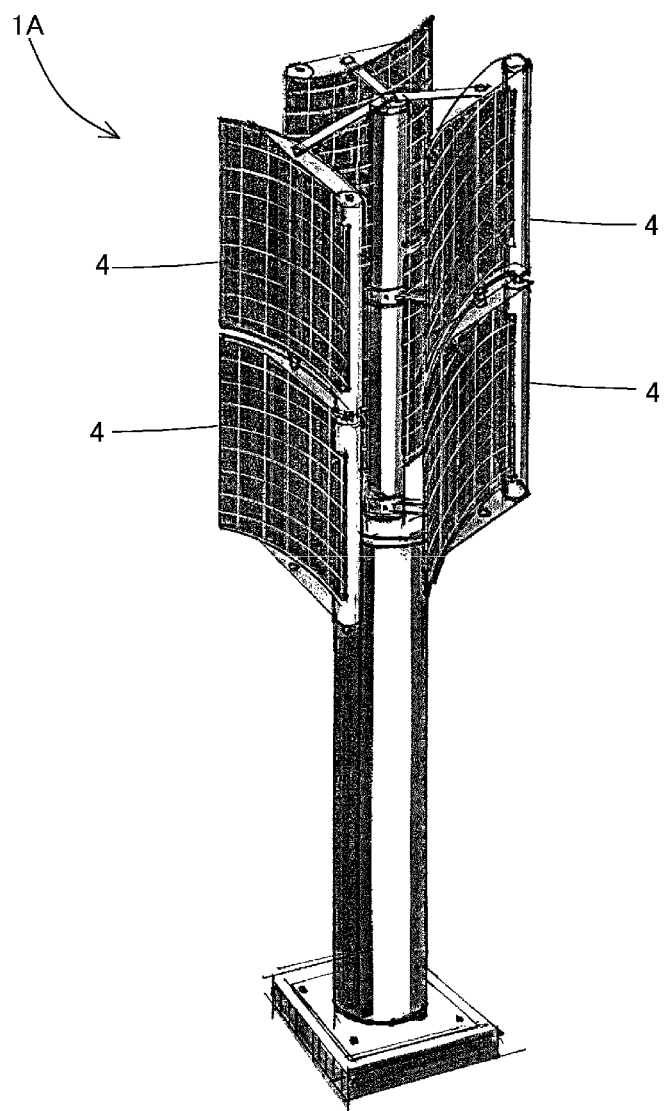
FIG. 7 is a perspective view of a wind power generator according to another embodiment of the present invention.

Furthermore, as shown in FIG. 7, a plurality of wind paddles 4 may be vertically coupled so that the curved panel part 41 according to this embodiment has a vertically elongated shape.

Figure 8:
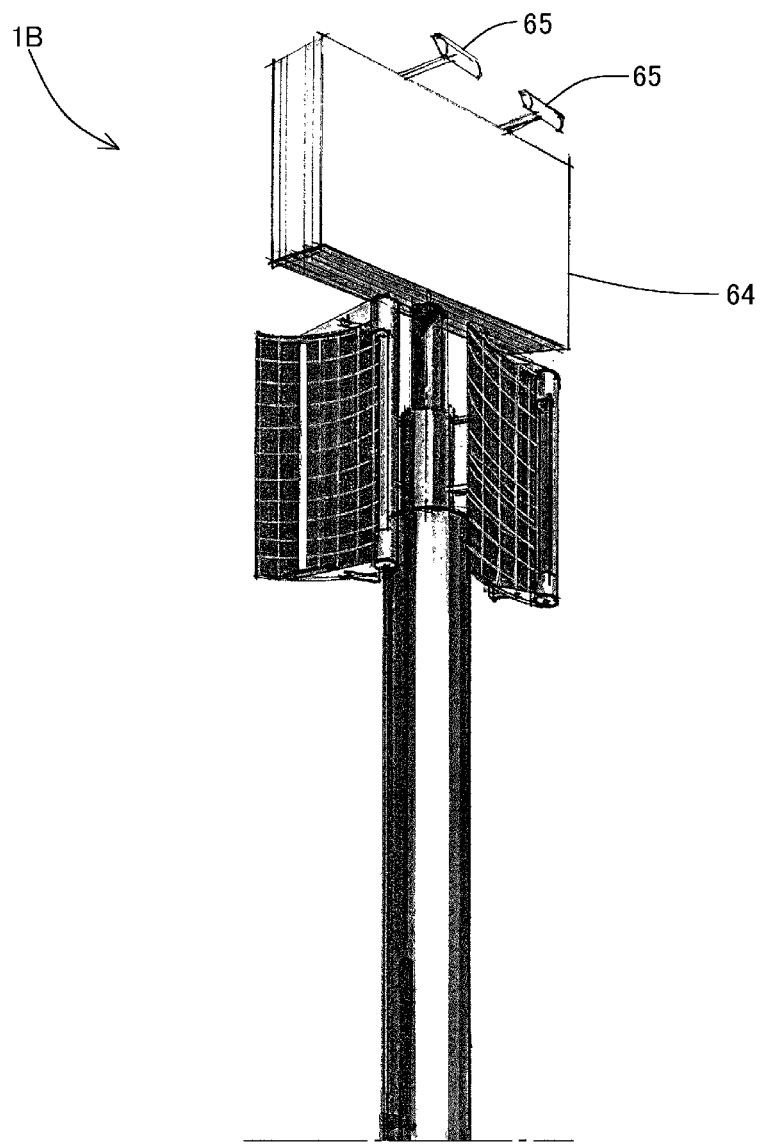
FIG. 8 is a perspective view of a wind power generator according to another embodiment of the present invention.

Furthermore, as shown in FIG. 8, a company advertisement sign 64 may be installed on the upper end part of the vertical rotation shaft 2. In that case, the electric power required by an illuminator 65 of the sign 64 can be sufficiently supplied, and any excessive electric power can be sold to an electric power company to gain a profit.

REFERENCE SIGNS LIST

1 wind power generator
2 vertical rotation shaft
3 supporting arm
4 wind paddle
5 solar photovoltaic power generating element
6 shaft support
7 wind power generating motor
8 rotation transmission mechanism
8 solar photovoltaic charger
10 energizing mechanism
31 upper supporting arm
32 lower supporting arm
41 concave panel part
42 front edge airflow reservoir part
43 upper edge airflow stopping part
44 lower edge airflow stopping part
45 front edge part
46 rear edge part
47 upper edge part
48 lower edge part
49 airflow stopping hole
51 positive electrode
52 negative electrode
61 base part
62 shaft supporting part
63 ball bearing
64 sign
65 illuminator
66 magnet
67 socket
71 rotation shaft
81 motor-side gear
82 rotation shaft-side gear
91 positive electrode
92 negative electrode
101 element-side positive electrode gear
102 element-side negative electrode gear
103 shaft support-side positive electrode gear
104 shaft support-side negative electrode gear
411 outer surface
412 inner surface

The invention claimed is:

1. A wind power generator, comprising:
   a vertical rotation shaft that transmits a rotational force to a wind power generating motor;
   a plurality of supporting arms radially provided on the vertical rotation shaft at regular intervals; and
   a wind paddle connected to a tip end of each of the supporting arms, wherein
   the wind paddle includes a concave panel part and a front edge airflow reservoir part, the concave panel part being curved or bent to be recessed on the side of an outer surface thereof in plan view, the front edge air flow reservoir part being provided along a front edge part of the concave panel part, which is located forward in a direction of rotation, and protruding on the side of the outer surface, and a tip end portion of the front edge airflow reservoir part being curved or bent toward a rear edge part of the concave panel part,
   the length from a part of the wind paddle connected to the supporting arm to the rear edge part of the wind paddle is longer than the supporting arm,
   the wind paddle has a vertically elongated shape with a vertical dimension of the wind paddle being longer than the distance between the front edge part and the rear edge part, a solar photovoltaic power generating element is provided on either or both of an inner surface and the outer surface of the concave panel part, the wind power generator includes an energizing mechanism that passes a current between an electrode of the solar photovoltaic power generating element and an electrode provided on a shaft support that supports the vertical rotation shaft, and
   the energizing mechanism includes:
   an element-side positive electrode gear that is fixed to the vertical rotation shaft and connected to a positive electrode of the solar photovoltaic power generating element so that a current can flow between the vertical rotation shaft and the positive electrode of the solar photovoltaic power generating element;
   an element-side negative electrode gear that is fixed to the vertical rotation shaft and connected to a negative electrode of the solar photovoltaic power generating element so that a current can flow between the vertical rotation shaft and the negative electrode of the solar photovoltaic power generating element;
   a shaft support-side positive electrode gear that is rotatably fixed to the shaft support, engaged with the element-side positive electrode gear and connected to a positive electrode of the shaft support so that a current can flow between the element-side positive electrode gear and the positive electrode of the shaft support; and
   a shaft support-side negative electrode gear that is rotatably fixed to the shaft support, engaged with the element-side negative electrode gear and connected to a negative electrode of the shaft support so that a current can flow between the element-side negative electrode gear and the negative electrode of the shaft support.

2. The wind power generator according to claim 1, wherein the front edge airflow reservoir part is formed by a pipe that has an airflow stopping opening formed by cutting away an inner portion of the pipe along an axis of the pipe that extends in an vertical direction.

* * * * *